No. 825,311. PATENTED JULY 10, 1906.
E. J. FLATHER.
GEAR CUTTING MACHINE.
APPLICATION FILED JUNE 18, 1904.

9 SHEETS—SHEET 2.

Witnesses.
B. Bullock
E. Batchelder

Inventor:
E. J. Flather
by
Wright Brown Quinby
Attorneys.

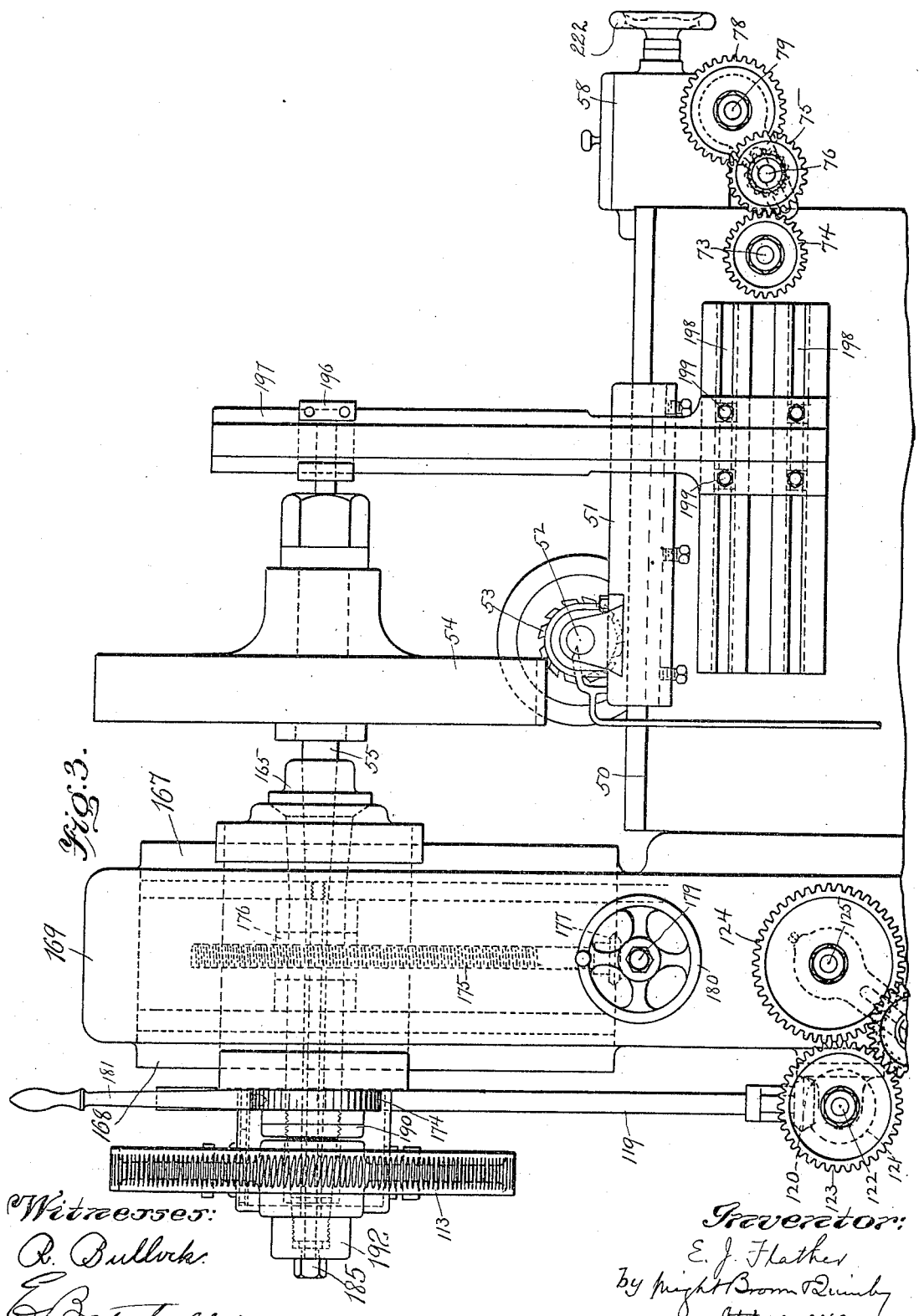

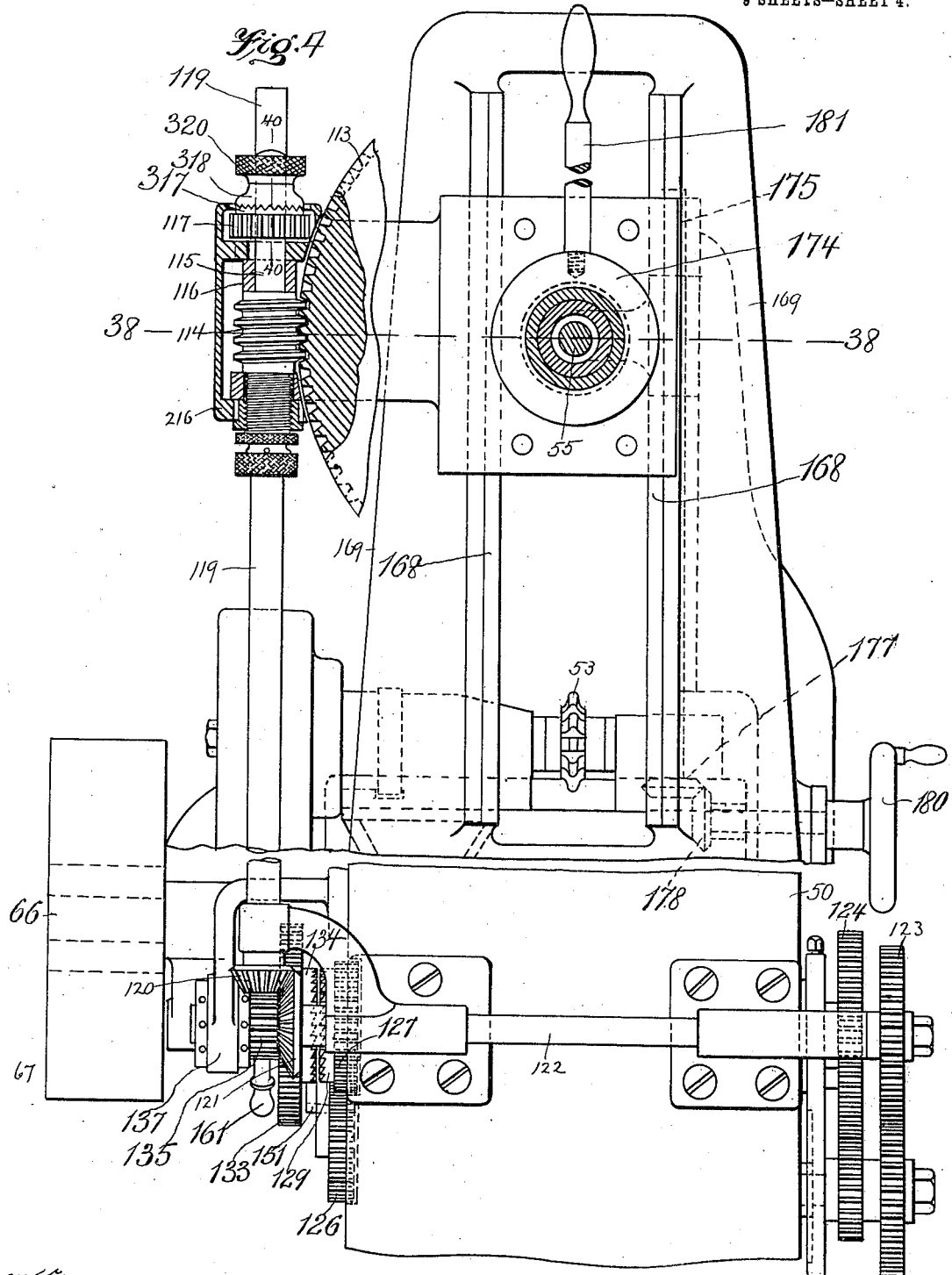

No. 825,311. PATENTED JULY 10, 1906.
E. J. FLATHER.
GEAR CUTTING MACHINE.
APPLICATION FILED JUNE 18, 1904.
9 SHEETS—SHEET 5.
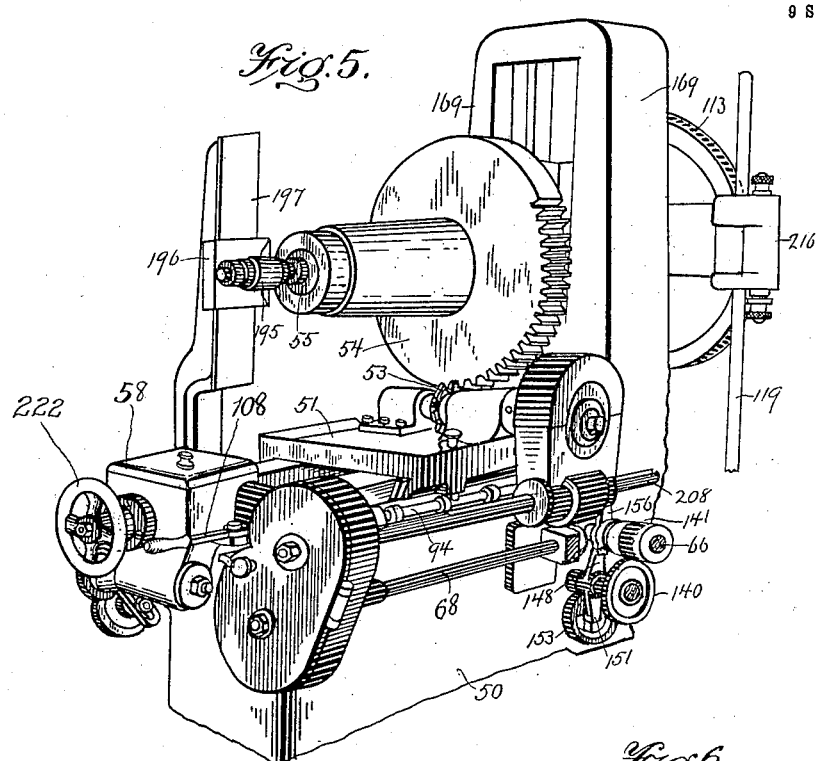
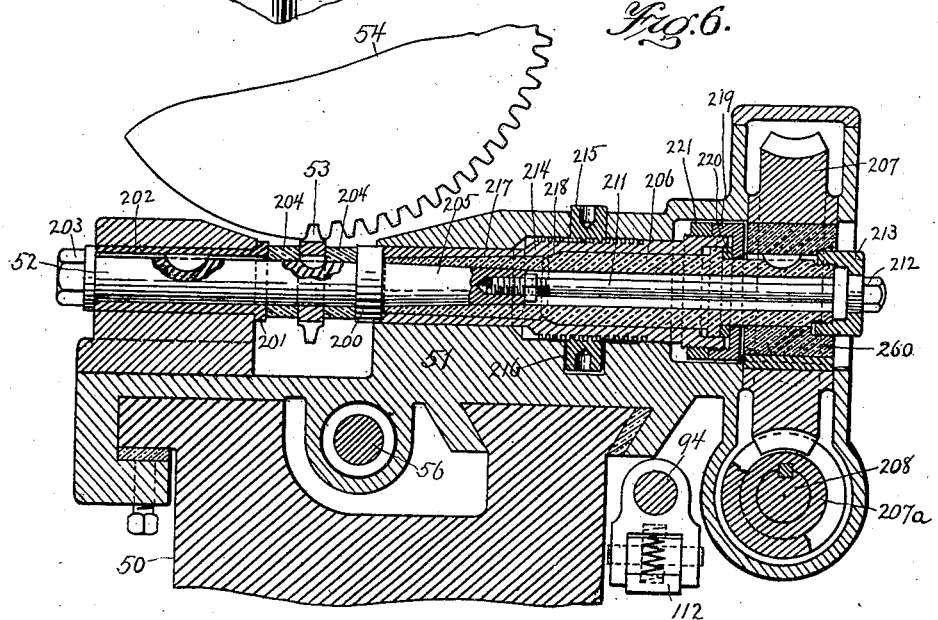

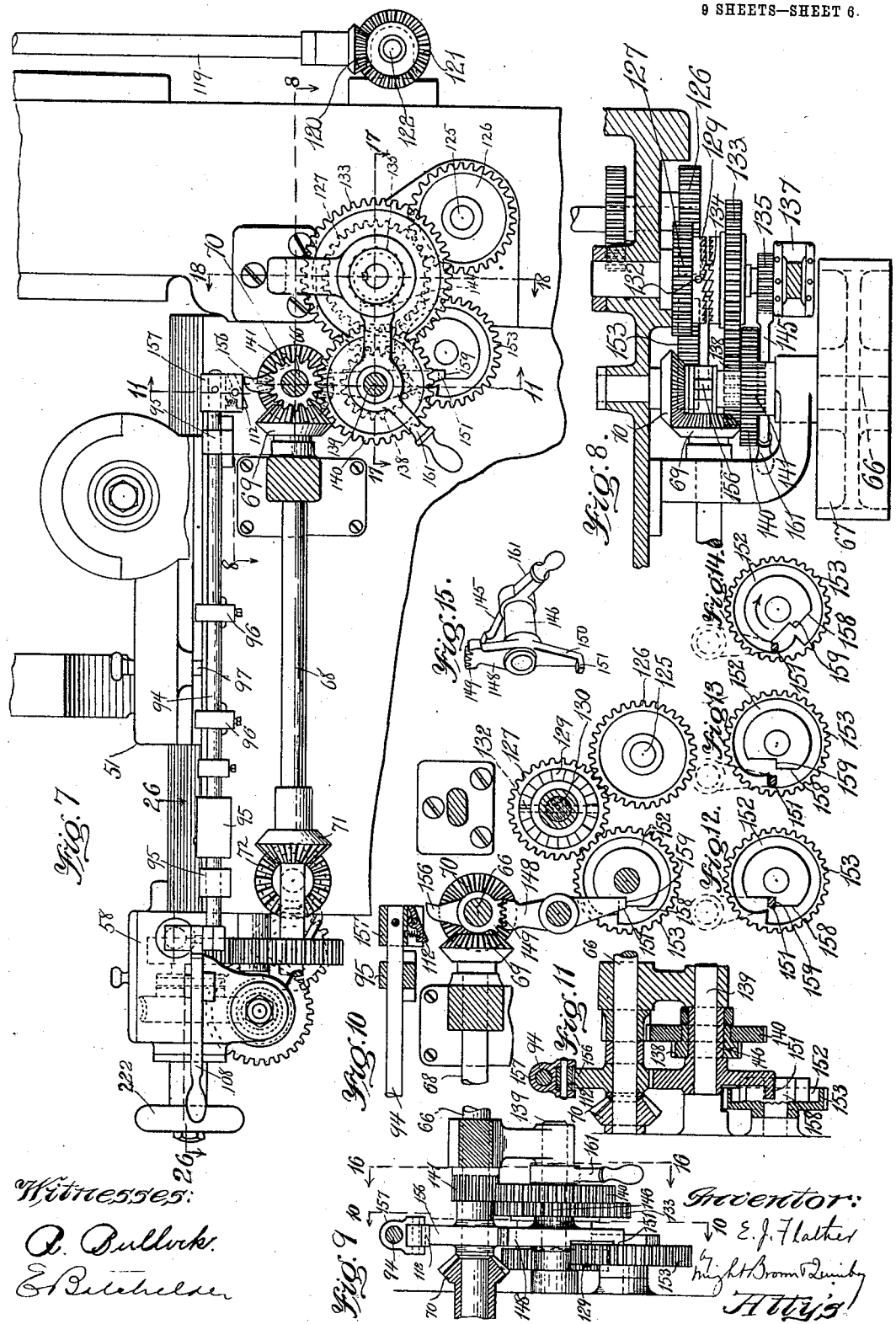

No. 825,311. PATENTED JULY 10, 1906.
E. J. FLATHER.
GEAR CUTTING MACHINE.
APPLICATION FILED JUNE 18, 1904.
9 SHEETS—SHEET 7.
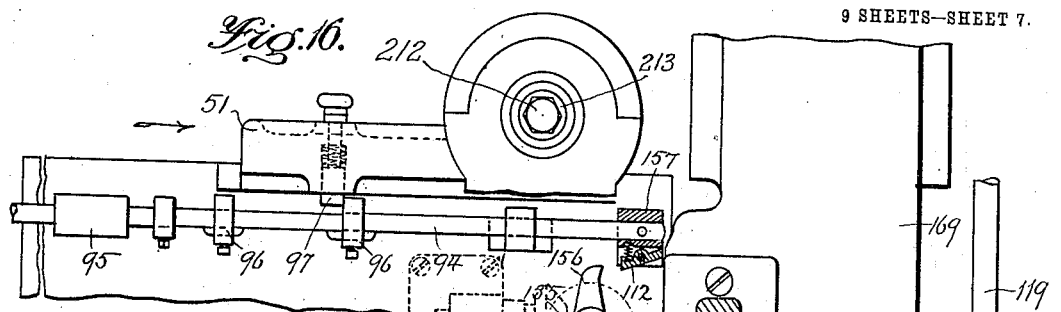
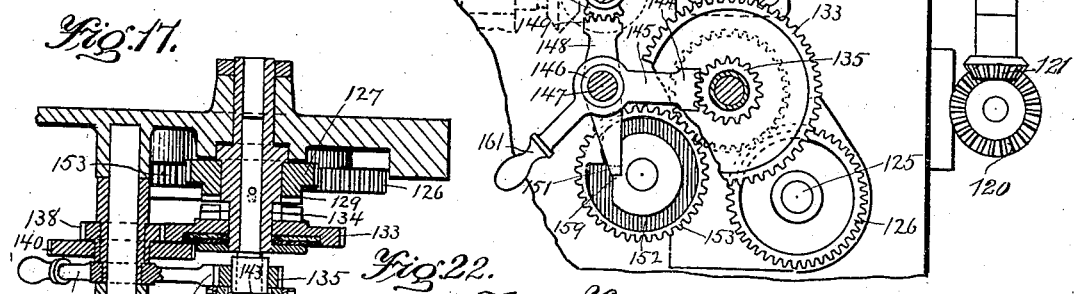
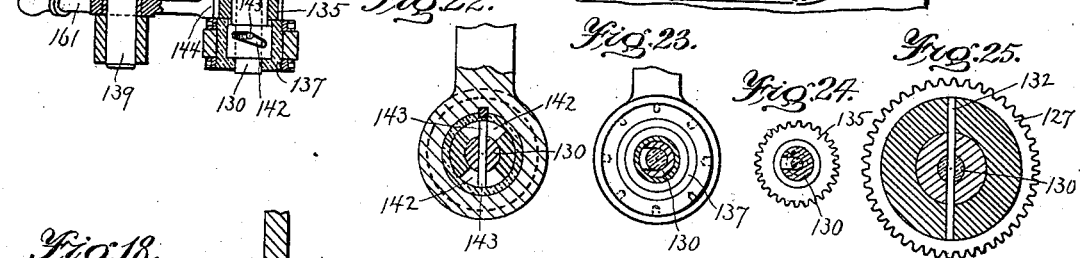
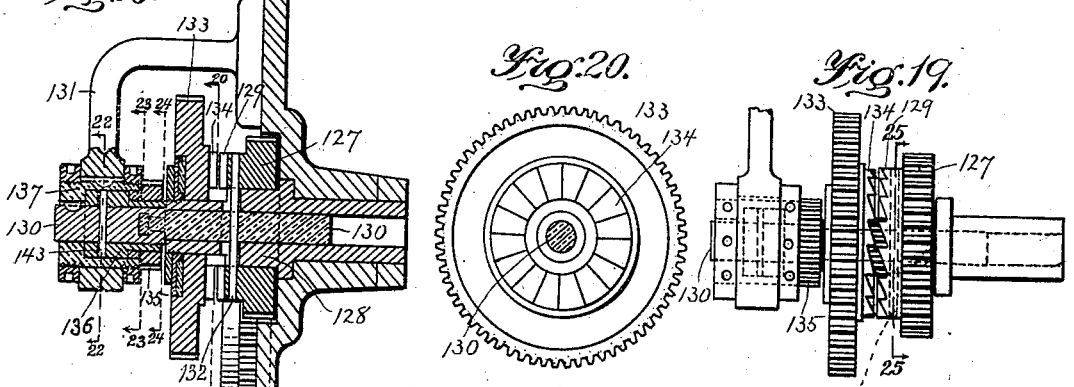
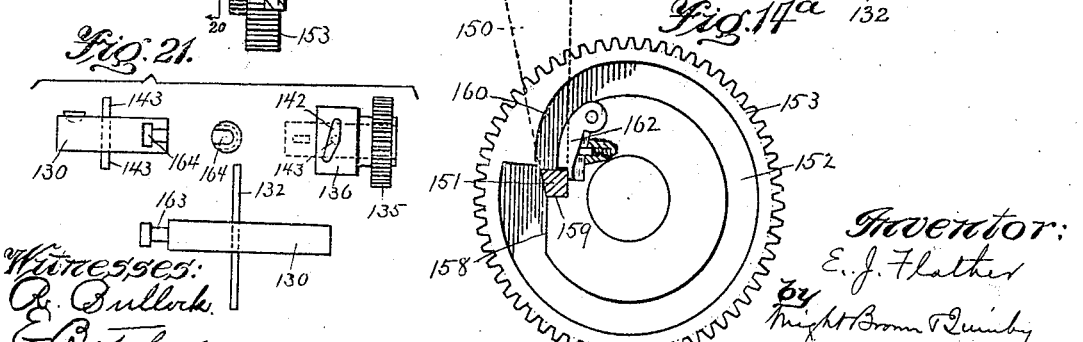

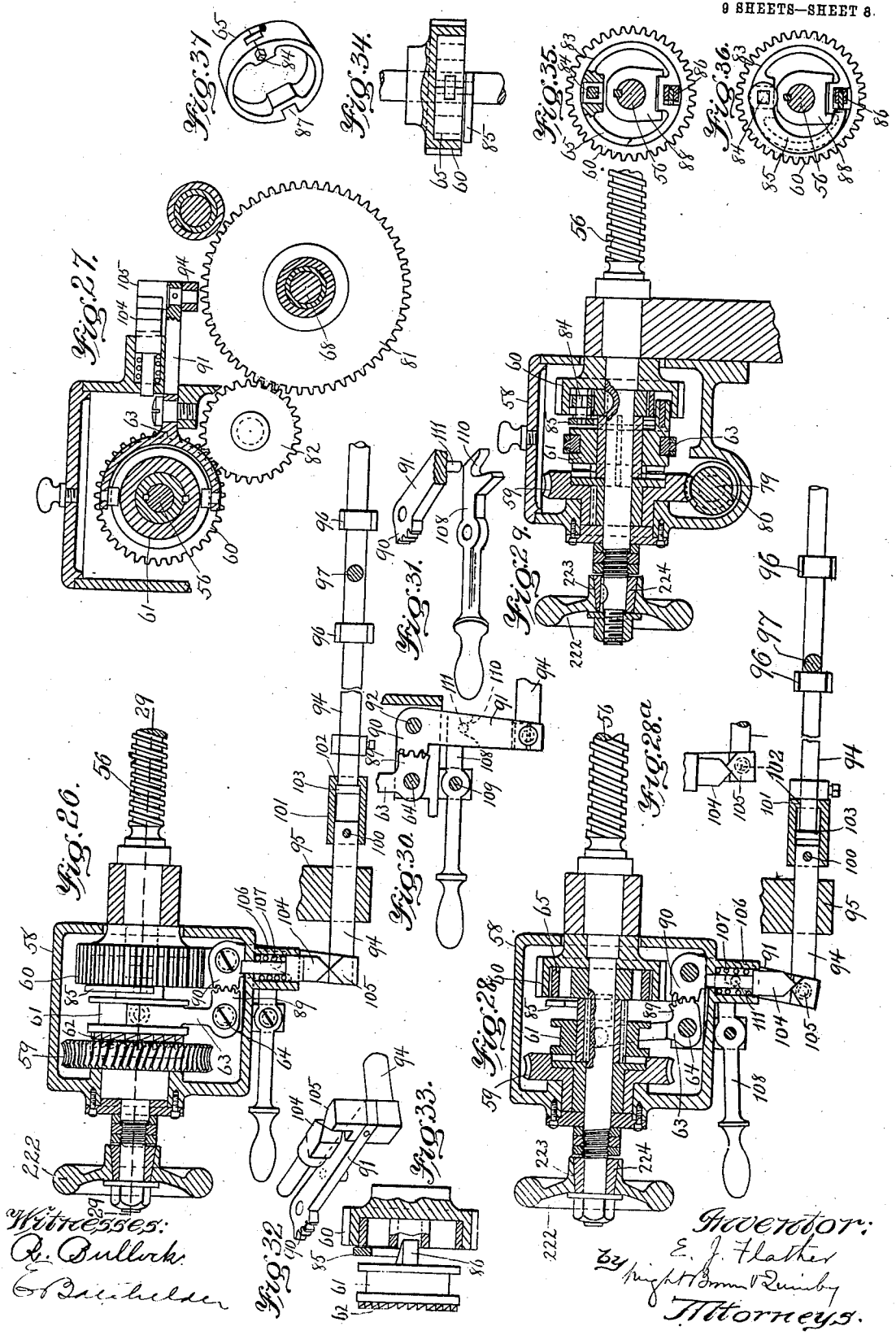

No. 825,311. PATENTED JULY 10, 1906.
E. J. FLATHER.
GEAR CUTTING MACHINE.
APPLICATION FILED JUNE 18, 1904.
9 SHEETS—SHEET 9.
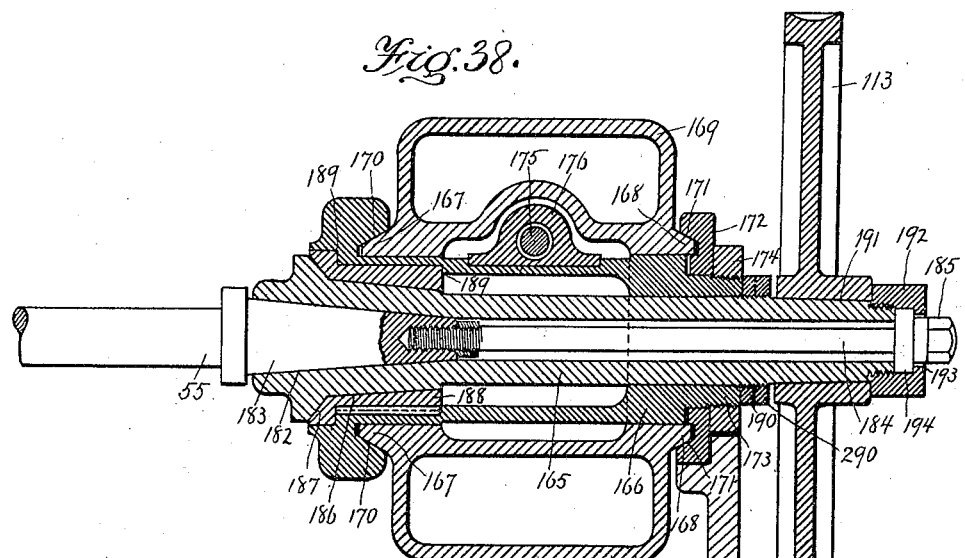
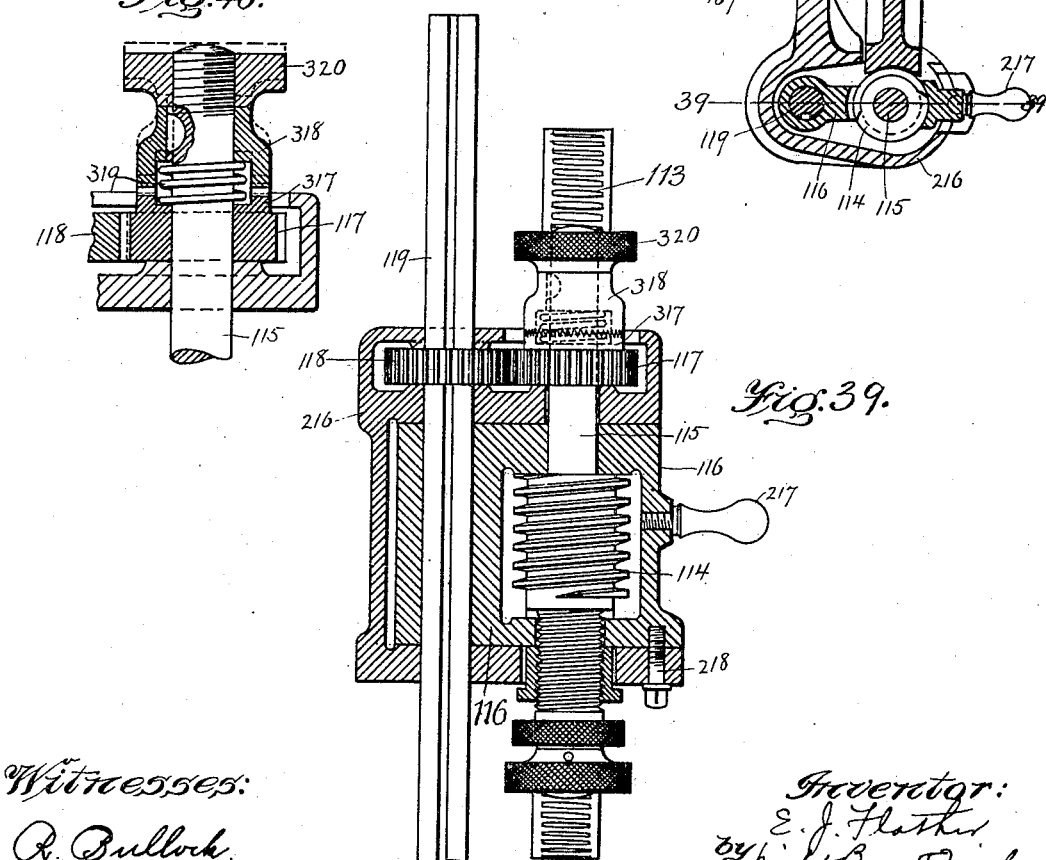

UNITED STATES PATENT OFFICE.

ERNEST J. FLATHER, OF NASHUA, NEW HAMPSHIRE.

GEAR-CUTTING MACHINE.

No. 825,311.  Specification of Letters Patent.  Patented July 10, 1906.

Application filed June 18, 1904. Serial No. 213,070.

*To all whom it may concern:*

Be it known that I, ERNEST J. FLATHER, of Nashua, in the county of Hillsboro and State of New Hampshire, have invented certain new and useful Improvements in Gear-Cutting Machines, of which the following is a specification.

This invention relates to gear-cutting machines in which a gear-blank is rotated step by step and locked after each step in position to be acted on by a rotary cutter or hob which moves forward and back across the periphery of the blank while the latter is locked.

The invention consists in certain improvements, hereinafter described and claimed in machines of this class, relating to the means for advancing and retracting the cutter-carriage and giving the latter a relatively slow forward movement and a quicker backward movement, to the indexing mechanism for rotating and locking the gear-blank, and to various details of mechanism, all having in view the production of a simple, efficient, and accurately-operating gear-cutting machine.

Figure 1:
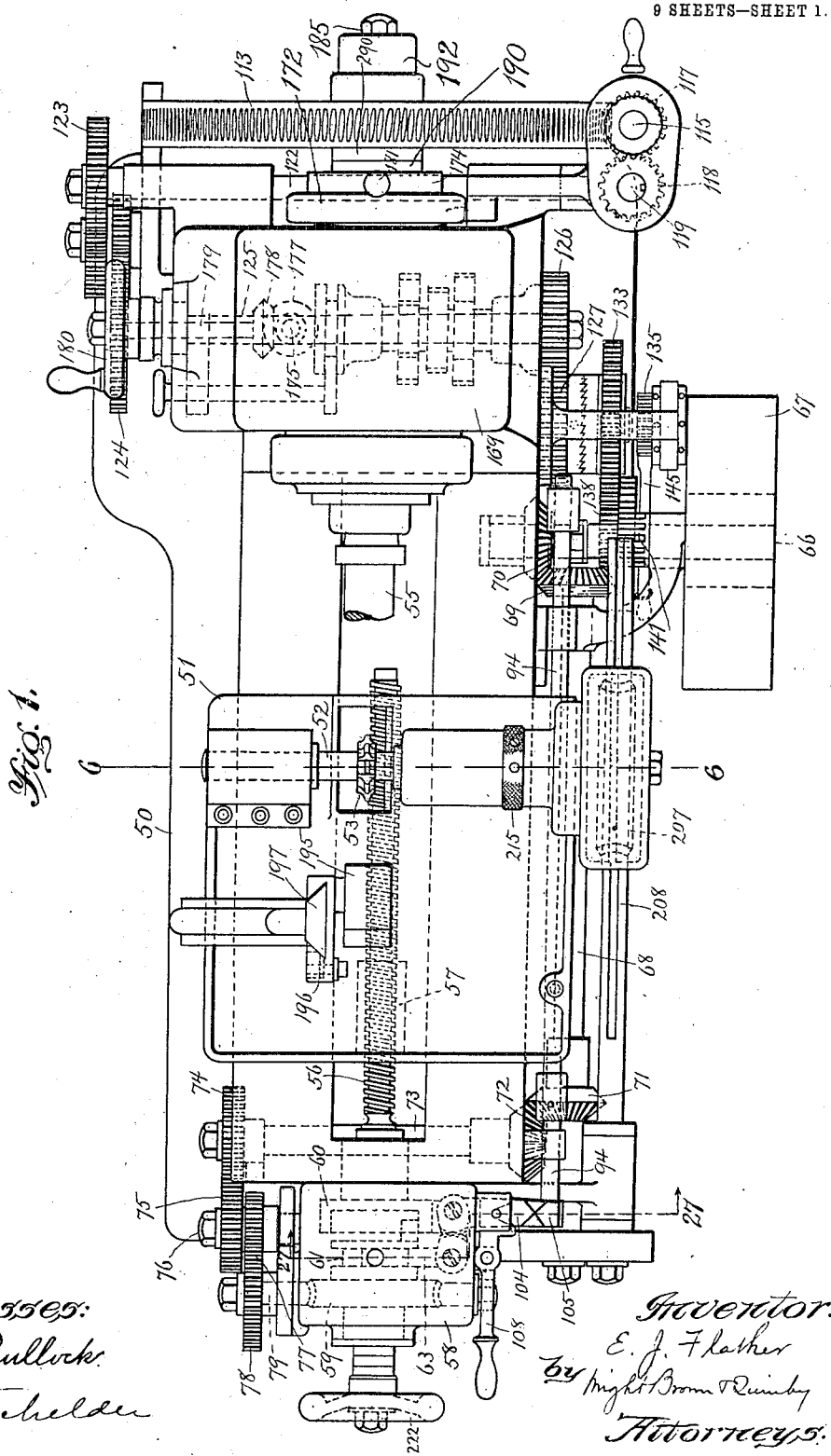
Figure 2:
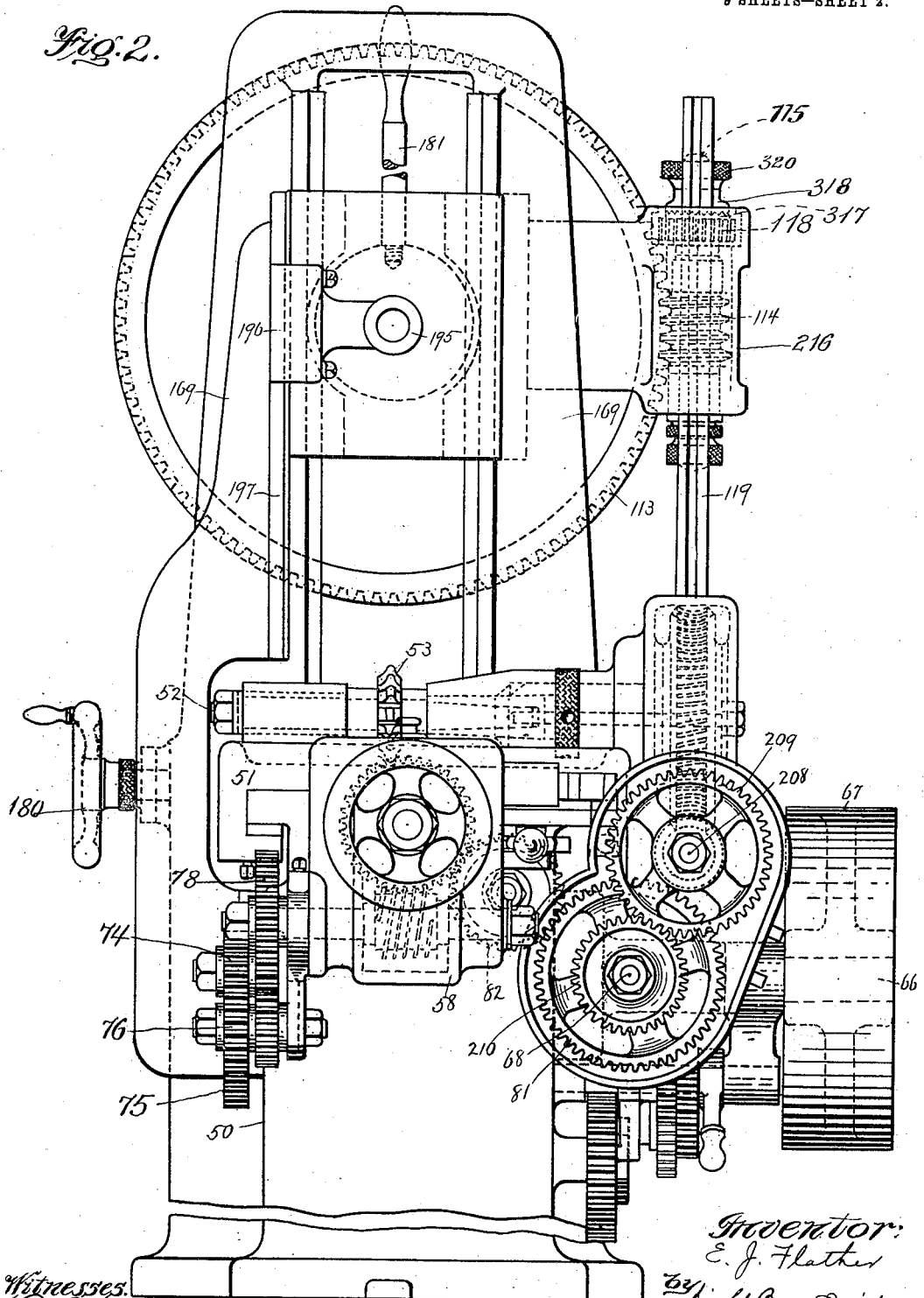

Of the drawings accompanying this specification and forming a part thereof, Figure 1 represents a top plan view of a machine embodying my improvements. Fig. 2 represents a front end elevation of the same. Fig. 3 represents a side elevation of the machine looking from the left of Fig. 2. Fig. 4 represents an end elevation and partial section looking from the left of Fig. 3. Fig. 5 represents a perspective view of a portion of the machine looking from the right of Fig. 2. Fig. 6 represents a vertical transverse section on line 6 6 of Fig. 1. Fig. 7 represents a side elevation of the operating mechanism looking from the right in Fig. 2, parts being removed for clearness. Fig. 8 represents a top plan view of the driving and indexing mechanism, the supporting-frame being shown in section on line 8 8 of Fig. 7. Fig. 9 represents a side elevation of Fig. 8, the driving-pulley and its support being removed. Fig. 10 represents a sectional view on line 10 10 of Fig. 9, showing the indexing tripping mechanism. Fig. 11 represents a section on line 11 11 of Fig. 7. Figs. 12, 13, 14, and 14ª represent views of the index-controlling cam, showing different positions hereinafter explained. Fig. 15 represents a perspective view of a part of the indexing mechanism hereinafter explained. Fig. 16 represents a section on line 16 16 of Fig. 9. Fig. 17 represents a section on line 17 17 of Fig. 7. Fig. 18 represents a section on line 18 18 of Fig. 7. Fig. 19 represents a side elevation of a part of the mechanism shown in Fig. 18. Fig. 20 represents a section on line 20 20 of Fig. 18. Fig. 21 represents a side elevation of a portion of the parts shown in Fig. 18. Fig. 22 represents a section on line 22 22 of Fig. 18. Fig. 23 represents a section on line 23 23 of Fig. 18. Fig. 24 represents a section on line 24 24 of Fig. 18. Fig. 25 represents a section on line 25 25 of Fig. 19. Fig. 26 represents a horizontal sectional plan of the mechanism employed to feed the cutter-carriage to and from the work, the casing and hand-wheel being shown in section taken on the line 26 26 of Fig. 7. Fig. 27 represents a section on line 27 27 of Fig. 1. Fig. 28 represents a horizontal section on the same line as Fig. 26, showing the construction and relation of the operating parts, said parts being in a different position from those in Fig. 27. Fig. 28ª represents a view of the parts in a different position. Fig. 29 represents a section on line 29 29 of Fig. 26. Fig. 30 represents a view of the mechanism employed in controlling the cutter-carriage-operating devices. Figs. 31 and 32 represent perspective views of these parts, which will be explained hereinafter. Figs. 33, 34, 35, 36, and 37 are detail views of the reversing-clutch employed to reverse the carriage-feed screw. Fig. 38 is a horizontal section on the line 38 38 of Fig. 4, showing the means employed for securing the boxes in which the index-arbor is mounted to the frame. Fig. 39 is a section on line 39 39 of Fig. 38, showing the manner in which the index-wheel is operated. Fig. 40 is a section on line 40 40 of Fig. 4, showing how the worm which drives the index-wheel may be separated therefrom.

The same letters of reference indicate the same parts in all the figures.

Upon the bed 50 of the machine is mounted a reciprocating carriage 51, supporting the bearings in which the cutter-shaft 52 is journaled. To the cutter-shaft is affixed the toothed cutter or hob 53, which is formed to cut gear-teeth in a gear-blank 54, the cutter being rotated by mechanism hereinafter described and receiving from the carriage a reciprocating movement at right angles to its axis. The gear-blank is supported by a rotary shaft 55, which is rotated step by step by a suitable indexing mechanism hereinafter described. The mechanism for reciprocating the carriage 51 is organized to give the cutter a relatively slow forward movement and a more rapid backward movement, the mechanism for imparting these movements being as follows: 56 represents a feed-shaft having a screw-threaded portion engaged with an internally-threaded ear 57, (see dotted lines in Fig. 1,) affixed to the carriage 51. The outer portion of said shaft is journaled in bearings within a fixed casing 58. On the feed-shaft within said casing are loosely mounted a carriage-feeding worm-wheel 59 and a carriage-retracting gear 60, these being separated from each other by a space occupied by a sliding clutch member 61 which has a sliding and a rotative engagement with the feed-shaft 56 and is provided with clutch-teeth 62, Fig. 32, formed to engage complemental clutch-teeth on one side of the worm-wheel 59. The sliding clutch member 61 is alternately moved into and out of engagement with the worm-wheel 59 by an oscillatory shipping-lever 63, which is pivoted at 64 and is forked to engage a peripheral groove in the sliding clutch member 61. The worm-wheel 59 and the retracting-gear 60 are continuously rotated by connections hereinafter described with the driving-shaft of the machine, the worm-wheel being rotated at a relatively slow rate and the retracting-gear more rapidly. When the sliding clutch member 61 is engaged with the worm-wheel, the slow rotation of the latter is imparted to the feed-shaft 56 in the direction required to move the carriage and cutter forward and cause the cutter to act on the blank. When the sliding clutch member is moved toward the retracting-gear 60, it coöperates with an expansible clutch ring or member 65, hereinafter described, within said retracting-gear in imparting to the feed-shaft the more rapid rotation of the retracting-gear, the latter rotating the feed-shaft backwardly and causing the return movement of the carriage and cutter.

The main driving-shaft 66 of the machine is journaled in bearings at one side of the bed and is provided with a pulley 67. The carriage-operating mechanism is driven by said shaft, and the part of said mechanism that operates the worm-wheel 59 includes a shaft 68, extending lengthwise of the bed and having a bevel-gear 69, meshing with a bevel-gear 70, affixed to the driving-shaft 66 and a bevel-gear 71, meshing with a bevel-gear 72, affixed to a shaft 73, extending crosswise of the bed. To the shaft 73 is affixed a gear 74, meshing with an intermediate gear 75, affixed to an intermediate shaft 76, to which is affixed a gear 77, meshing with a gear 78, affixed to a shaft 79, extending crosswise of the bed. To the last-mentioned shaft 79 is affixed a worm 80, Fig. 29, meshing with the clutch-carrying worm-wheel 59. The part of the carriage-operating mechanism that operates the carriage-retracting gear 60 includes a gear 81, Fig. 27, affixed to the shaft 68, and an intermediate gear 82, connecting the gear 81 with the said retracting-gear 60. The said retracting-gear 60 has a recess in one side, the margin 83, Figs. 35 and 36, of which constitutes a friction-clutch member. Within said recess is located an expansible clutch member 65, Fig. 37, which is a split ring. Said ring is expanded to engage the margin of the recess in the retracting-gear by a squared shaft 84, journaled in a divided and squared bearing formed at the division of the ring 65, said shaft having a curved arm 85, Fig. 36, the outer end of which is located in the path of movement of a beveled finger 86, Figs. 32 and 33, affixed to the clutch member 61. When said clutch member is moved toward the retracting-gear 60, the finger 86 swings the arm 85 outwardly and causes the squared shaft 84 to turn slightly and separate the ends of the split ring 65, thus expanding said ring and forcing it into frictional contact with the margin 83 of the recess in the retracting-gear. The said ring is provided with a recess 87, the ends of which constitute shoulders which engage a shouldered collar 88, Figs. 35 and 36, affixed to the shaft 56, while the cutter-carriage is advancing, it being then out of engagement with the interior face of said gear. The ring 65 is therefore rotated in the retracting-gear by the shaft 56 and when expanded into contact with the margin 83 of the recess of said gear the latter causes the rotation of the screw 56 to return the cutter-carriage. The recess 87 of the clutch-ring 65 receives the beveled finger 86 on the sliding clutch member 61 when the latter is moved toward the retracting-gear 60.

The forked shipping-lever 63, which operates the sliding clutch member 61, is pivoted at 64 to a fixed support and has an arm 89, Figs. 26 and 30, on which are formed the teeth of a gear-segment, meshing with the teeth of a like segment, formed on one arm 90 of a lever 91, which is pivoted at 92. The other arm of the lever 91 is pivoted at 93 to a rod 94, which slides in fixed guides 95, Fig. 7, lengthwise of the bed and is reciprocated by the cutter-carriage 51 to oscillate the shipping-lever 63 and cause the described movements of the sliding clutch member 61. The rod 94 is provided with collars 96 96, between which plays a stud 97, affixed to the cutter-carriage 51. When the carriage has moved the cutter forward across the gear-blank, the stud 97 strikes one of the collars 96 and moves the rod 94 in the direction required to move the clutch member 61 through the described connections, out of engagement with the worm-wheel 59, and into engagement with the arm 85, which expands the clutch-ring 65 in the retracting-gear 60. The movement of the carriage is thus reversed, and the carriage is retracted with a quick movement until the stud 97 on the carriage strikes the other collar 96 on the rod 94 and moves the latter to cause the clutch member 61 to engage the worm-wheel 59. The rod 94 is constructed so that the cutter-carriage may have a limited movement after its movement is reversed before movement is imparted to the clutch member 61 in order to operate the indexing mechanism, hereinafter described, before the clutch member is operated to advance the cutter. To this end the rod is made in two sections, as shown in Fig. 26. To one section is affixed by a pin 100 a sleeve 101, having an internal shoulder 102, engaging a shoulder 103, formed on the other section of the rod. The shouldered section of the rod is adapted to play between the internal shoulder of the sleeve 101 and the end of the other section sufficiently to permit a sufficient movement of the carriage to permit the operation of the indexing mechanism before the cutting operation is begun. Thus after the cutter has been advanced across the work, cutting a tooth, stud 97 engages the right-hand collar 96 and draws out the members of the telescopic rod 94 to their fullest extent, bringing shoulders 102 103 into contact and shifting the shipper-lever lever 63 so as to set in operation the retracting-gear, and the cutter-carriage is carried back into position for beginning a new cut on the blank; but when the cutter has been drawn wholly out of the latest-made cut stud 97 engages the left-hand collar 96 and moves the right-hand section of rod 94 a certain distance to the left before the left-hand section of said rod is moved to actuate the shipper, and during this preliminary motion of the right-hand section of the rod a trip member 112, carried by it, engages a portion of the indexing mechanism, hereinafter fully described, and trips the latter, allowing said mechanism to be operated so as to rotate the blank into position to receive another cut.
The carriage meanwhile continues its rearward movement until the ends of the rod-sections come into contact, whereupon the shipper is actuated to throw gear 60 out of and worm-wheel 59 into connection with feed-shaft 56, and the carriage is again driven forward. It will be seen that the rod 94 constructed as described permits a certain amount of lost motion to take place after the rod is engaged by stud 97 before the shipping mechanism is actuated, which is sufficient to permit complete indexing of the blank before the next cut is commenced, thereby insuring absolutely against any danger of the cut being prematurely commenced.
With the types of machines now in use it sometimes happens that a cut is commenced before the blank has been fed through the distance between the teeth and while the blank is still turning, thereby spoiling the
gear which is being made, and such an acci-
dent is liable to occur at any time; but with the present machine this kind of accident is impossible, as the lost motion automatically causes the blank to be completely indexed in all cases before the cut is begun.

The rod 94 is yieldingly arrested at each end of its movement by a V-shaped latch 104, Figs. 26, 28, 28ª, and 32, which coöperates with a V-shaped projection 105 on the lever 91. The latch 104 is fitted to slide in a fixed socket 106 and is yieldingly projected therefrom by a spring 107, Fig. 28. When the sliding clutch 61 is engaged with the worm-wheel 59, the said latch and projection are engaged, as shown in Fig. 28, and when the clutch is engaged with the arm which expands the clutch-ring in the retracting-gear 60 the latch and projection are engaged, as shown in Fig. 28ª. The sliding clutch 61 may be held in an inoperative or intermediate position by a lever 108, Figs. 30 and 31, which is pivoted at 109 to a fixed support and has an arm containing a V-shaped notch 110, adapted to engage a stud 111 on the lever 91. When the lever is in the position shown in Fig. 30, the sides of the said notch engage the stud 111 and lock the lever 91 and the shipping-lever 63, with the sliding clutch in its inoperative position. When the lever 108 is in the position shown in Fig. 28, it is out of engagement with the stud 111, but the stud is still between the sides of the notch, and as these sides are outwardly inclined there is enough latitude of movement between them allowed the stud to permit the shipper to move far enough either way to connect either clutch with its respective driver. Moving the lever from its inoperative position shown in Fig. 28 to the position of Fig. 30 causes one of the sides of the notch to engage the stud 111 and move it, and thereby the shipper and clutch, into intermediate position When the sliding clutch is held in its intermediate position by the lever 91, the latch 104 and projection 105 are relatively positioned as shown in Figs. 26 and 32. The flaring sides of the V-shaped notch act as cam-surfaces, which when the lever is moved to bring the arm having the notch toward the stud are adapted to engage the stud in whatever position it may occupy and guide it into the notch as the lever continues its movement. Thus the shipper mechanism can be moved into a central inoperative position from either extreme position by movement of the lever alone and locked in such position by the lever.

The gear-blank 54 is secured to a shaft 55, mounted in an adjustable bearing, hereinafter described, above the bed and rotated step by step to present different parts of the periphery of the blank to the cutter by an indexing mechanism operated step by step by a spring-pawl 112, Figs. 7, 10, and 16, carried by the clutch-operating rod 94.

Said indexing mechanism, which gives the blank a partial rotation during each backward movement of said rod and is locked during the forward movement of the rod and cutter, is organized as follows: 113 represents a worm-geared index-wheel affixed, as hereinafter described, to the driving-spindle of the blank-carrying shaft. With said wheel meshes a worm 114, Fig. 4, engaged with a vertical shaft 115, journaled in bearings in a hinged arm 116, which is adapted to swing, as hereinafter described, to permit the separation of the worm from the index-wheel. The shaft 115 has a gear 117, meshing with a gear 118, Fig. 39, having a rotative engagement with a vertical shaft 119 journaled in fixed bearings, the said gear 118 having also a sliding engagement with its shaft by means of a longitudinal groove in the shaft and a key in the hub of the gear to permit the hereinafter-described vertical adjustment of the blank-carrying shaft. The arm 116 is hinged on the shaft 119, as shown in Figs. 38 and 39, and is inclosed in a fixed casing 216, supported by and extending laterally from the bearing in which the blank-holding shaft 55 is mounted and formed to permit the arm to swing laterally. The arm has a handle 217 projecting from the casing, whereby it may be moved. A screw 218 locks the arm to the casing.

The gear 117 is provided with a clutch member 317, having radial clutch-teeth meshing with like teeth on a complemental clutch member 318, which is a collar splined upon the shaft 115 and adapted to rotate therewith. The clutch members are recessed to receive a spring 319, Fig. 40, surrounding the shaft 115. The upper end of the latter is screw-threaded and provided with a nut 320, which ordinarily is adjusted to hold the member 318 against the resistance of the spring in engagement with the member 317, so that the shaft 115 will be rotated through the gears 118 and 117. When the nut is loosened, the clutch members are separated, as shown by dotted lines in Fig. 40, thus permitting the adjustment of the index-wheel 113 by hand independently, the gear 117 being loose on the shaft 115 and the clutch member 318 splined on said shaft, as already stated.

To the lower end of the vertical shaft 119 is affixed a bevel-gear 120, Figs. 3 and 4, meshing with a bevel-gear 121, affixed to one end of a horizontal shaft 122, journaled in fixed bearings and extending crosswise of the bed. To the opposite end of the horizontal shaft 122 is affixed a gear 123, which constitutes one member of a series of change-gears and is connected by intermediate members of said series with another member 124, Figs. 1 and 3, affixed to one end of another horizontal shaft 125, extending across the bed. To the opposite end of the shaft 125 is affixed a gear 126, meshing with a clutch-gear 127, Fig. 1, which is rotatable and movable sidewise on a fixed tubular stud 128, Fig. 18, and is provided with a clutch member 129.

130 represents a shaft which is journaled in the tubular stud 128 and in a bearing in a fixed arm 131 and is movable endwise and engaged with the gear 127 by a pin 132, so that the gear 127 is moved sidewise by endwise movements of the shaft 130, effected as hereinafter described.

133 represents a clutch-gear journaled loosely on the shaft 130 and having a toothed clutch member 134 formed to engage the clutch member 129 on the movable gear 127.

135 represents a gear affixed to a sleeve 136, Fig. 21, which is journaled in a bushing 137, Fig. 18, and has an enlargement, Fig. 21, which engages shoulders in the bushing 137, as shown in Fig. 18, said shoulders preventing the sleeve 136 and gear 135 from moving endwise on the shaft 130, the latter, with its stud 143, having an endwise movement in said sleeve and gear.

The clutch-gear 133 is connected with the driving-shaft 66, and therefore constantly rotated by means of a gear 138, Figs. 17, journaled on a fixed stud 139, and a gear 140, affixed to the gear 138 and meshing with a gear 141 on the driving-shaft 66. The sleeve 136 is provided with oblique slots 142, Figs. 17 and 21, into which project studs 143 143, which are the end portions of a pin passed through the endwise-movable shaft 130. The gear 135 meshes with a gear-segment 144, formed on an arm 145, affixed to a hub 146, which is adapted to oscillate on the fixed stud 147. To the hub 146 is affixed an arm 148, having a gear-segment 149 and an arm 150, the latter having a stop-finger or detent 151, Figs. 12, 13, 14, and 15, which projects into a cam-groove 152 in a gear 153, meshing with the movable gear 127 on the shaft 130. The gear-segment 149 meshes with a gear-segment 154, formed on a hub 155, which is mounted to oscillate on the driving-shaft 66. Said hub has an arm or striker 156, which projects into the path of the pawl 112 on the rod 94. Said pawl is pivoted to a holder 157, affixed to the rod 94, and its acting end is yieldingly held by a spring, Fig. 16, in position to engage the striker 156 when the rod 94 is moving backwardly from the position shown in Fig. 16. The motion thus imparted to the striker 156 and to the gear-segment 154 affixed thereto causes a partial rotation of the sleeve-gear 135 through the described connections in the direction required to cause the oblique slots 142 to coöperate with the studs 143 in the longitudinally-movable clutch-shaft 130 in moving said shaft endwise in the direction required to connect the clutch-gear 127, engaged therewith, with the clutch member 134 on the constantly-driven loose gear 133. The indexing mechanism is thus set in motion and rotates the gear-blank forward. This forward rotation is stopped at the desired predetermined point by an automatic stop mechanism which comprises the gear 153, with its cam-groove 152 and the detent-arm 151, projecting into said cam-groove. The major portion of the cam-groove 152 is concentric with the axis of the gear 153. The inner wall of the groove is cut away at 158 to widen the groove and afford room for the movement of the detent 151 toward and from the axis of the gear 153. The said inner wall is provided with a shoulder 159, formed to abut against the detent, as shown in Figs. 10, 14, and 14ª, the detent being thus caused to lock the gear 153 and the indexing mechanism. The cam-groove has an eccentric portion 160 formed to move the detent 151 from a position outside the path of the shoulder 159 (shown in Fig. 14) to a position in said path, as shown in Figs. 12 and 14ª. The indexing mechanism is locked as above described while the cutter-carriage is moving forward and the cutter is acting on the blank. The forward movement of the carriage causes the rod 94 to move to the position shown in Fig. 16, the spring-pawl 112 on said rod snapping over the striker-arm 156 and being thus prepared to move said arm during the backward movement of the carriage and rod. When the pawl 112 encounters the striker-arm 156, it swings the latter in the direction required to remove the detent 151 from engagement with the shoulder 159 of the stop-gear 153, as shown in Fig. 13, the indexing mechanism being thus unlocked. At the same time the segment-geared arm 145 is moved in the direction required to cause the engagement of the clutch-gear 127 with the driving clutch-gear 133, as described, so that the now unlocked indexing mechanism is operated until the eccentric portion 160 of the cam-groove in the locking-gear 153ª reaches the detent 151, as shown in Fig. 14. The outer wall of said eccentric portion then acts to swing the detent inwardly, thus imparting lateral motion to the sliding clutch-gear 127 through the described connections in the direction required to disengage it from the driving clutch-gear 133. Just as this disengagement is effected the shoulder 159 reaches the detent 151, and the locking-gear 153 and indexing mechanism are locked against further forward movement, the striker-arm 156 being at the same time restored to position to be again engaged by the pawl 112, as shown in Fig. 16, during the next backward movement of the carriage. The detent 151 and the clutch-operating arm 145 may be moved by hand, if desired, and to permit this a hand-lever 161, Figs. 15 and 16, is affixed to the hub 146. To prevent the possibility of the backward rotation of the locking-gear 153, I provide the latter with a spring-pressed latch 162, Fig. 14ª, formed and arranged to spring outwardly into engagement with the detent 151, said latch yielding when the detent is in the eccentric portion 160 of the cam-groove. The longitudinally-movable clutch-shaft 130 is preferably made in two sections, as indicated in Figs. 18 and 21, one having a male coupling member 163 and the other a female or socket coupling member 164, whereby the sections are detachably connected and caused to move endwise in unison. The enlarged portion of the sleeve 136, having the oblique clutch-operating slots 142, is journaled in a fixed bushing 137, Fig. 18, and is prevented from moving endwise by internal shoulders on said bushing.

The gear-blank-supporting shaft 55 is engaged at one end with the tubular driving-spindle 165, Fig. 38, to which the index-wheel 113 is affixed. Said spindle is journaled in a vertically-adjustable bearing 166, which is fitted to slide on vertical guides or gibs 167 167 168 168, Fig. 38, formed on the sides of an opening in a vertical standard 169 at one end of the bed 50. The inner surfaces of the guides, which form the main guiding-bearings for the spindle-holder 166, are flat and are located in vertical planes parallel to the axis of the driving-spindle. The outer sides of the guides are formed with beveled surfaces, with which shoulders on the bearing coact. The bearing 166 has fixed beveled shoulders 170 170, engaging the outer beveled surfaces of the guides at one side of said standard, and detachable beveled shoulders 171 171, engaging the guides at the opposite side of the standard and formed on a collar 172, which is detachably mounted on a boss 173 on the bearing 166. A nut 174, engaged with a screw-thread on said boss 173, when turned inwardly, acts to cause the shoulders 170 171 to force the guides 167 168 toward each other to bind against opposite sides of the bearing, and thus support the bearing 166 at any desired height, according to the diameter of the blank. When the nut 174 is loosened, the shoulders 170 171 release their clamping hold on the guides 167 168, and the bearing may be freely adjusted vertically by means of a vertical screw 175, Fig. 3, engaging a lug 176, affixed to the bearing 166. Said screw has a bevel-gear 177, meshing with a bevel-gear 178 on a shaft 179, having at its outer end a hand-wheel 180. The clamping-nut 174 has a handle 181, by which it may be turned to secure and release the bearing.

The tubular spindle 165 is provided at one end with a tapered enlargement 182 of its bore, which receives a tapered portion 183 of the blank-carrying shaft 55. An adjusting-rod 184, having a threaded inner portion, is engaged with a threaded socket formed in the tapered portion 183 of the shaft 55, and when rotated by means of a wrench applied to a head 185 on its outer end causes a firm bearing of the tapered portion 183 of the shaft 55 on the tapered interior of the spindle.

The spindle has an externally-tapered portion 186, at the outer end of which is a beveled shoulder 187. Said tapered portion and shoulder fit a bushing 188, preferably of bronze, which is keyed to and forms a part of the bearing 166. The tapered external portion of the spindle is held firmly against the tapered interior of the bushing, and the said bushing is held against shoulders 189 in the bearing 166 by means of a nut 190 engaging a threaded portion of the spindle and abutting against one end of the bearing 166. A lock-nut 290 confines the nut 190. The index-wheel 113 has an internally-tapered hub which bears on a tapered portion 191 of the periphery of the spindle near the outer end of the latter. The said hub is held in close frictional engagement with the spindle by a nut 192, engaged with the spindle and bearing against one end of the hub, said nut having an inwardly-projecting flange 193, which engages a shoulder 194 on the head of the adjusting-rod 185 and prevents outward movement of said rod.

The end of the blank-holding shaft 55 opposite that engaged with the spindle 165 is reduced and journaled in a bearing 195, formed on a slide 196, which is clamped to and vertically adjustable on a standard 197 at one side of the bed 50. Said standard is adjustable horizontally lengthwise of the bed by means of horizontal undercut guideways 198, Fig. 3 on the side of the bed, said ways receiving and permitting the horizontal adjustment of the heads of bolts 199, engaged with the standard 197. When the nuts of said bolts are loosened, the standard may be moved to vary its distance from the spindle-bearing. The shaft 52, on which the cutter or hub 53 is mounted, is provided with shoulders 200 and 201 at opposite sides of the cutter, the shoulder 200 being preferably integral with the shaft, while the shoulder 201 is formed on a sleeve 202, keyed to the shaft and removably secured thereto by a nut 203. Between the cutter and the shoulders 200 201 are interposed collars 204, which, with the cutter and the sleeve 202, are removable from the shaft, the cutter being keyed to the shaft. The cutter-shaft has a tapered portion 205, which is fitted in a correspondingly-tapered portion of the bore of a tubular spindle 206, which is keyed to a sleeve 260, to which the worm-gear 207, which rotates the spindle and cutter-shaft, is keyed, said worm-gear being rotated by a worm 207$^a$, which has a sliding and rotative engagement with a shaft 208. To the shaft 208 is affixed a gear 209, Fig. 2, meshing with a gear 210, affixed to the shaft 68. An adjusting-rod 211, having a screw-thread engagement with the cutter-shaft 52 and a wrench-engaging head 212, bearing on the outer end of the spindle 206, draws the tapered exterior of the cutter-shaft firmly against the tapered interior of the spindle, said head being engaged by an internally-flanged nut 213, secured upon the spindle, as shown in Fig. 6.

The spindle is journaled in a bearing 214, which is longitudinally adjustable in a housing affixed to the carriage. Said bearing has an externally-screw-threaded portion with which is engaged an adjusting-nut 215, located in a recess 216 in the housing and prevented from lateral movement by the sides of said recess, so that its rotation adjusts the cutter-shaft and spindle endwise. The sleeve 260 is movable endwise with the spindle, so that the rotative connection between the spindle and the gear 207 is not affected by the endwise adjustment of the spindle. The bearing 214 has an internally-tapered portion 217 and a beveled shoulder 218, and the spindle 206 has a corresponding externally-tapered portion and beveled shoulder. A nut 219, engaged with a threaded end portion of the bearing and having an inwardly-projecting flange, bears on a washer interposed between its flange and a shoulder 220 on the spindle, said nut when turned inwardly holding the tapered external surfaces of the spindle in contact with the tapered internal surfaces of the bearing. A lock-nut 221 holds the nut 219 against accidental rotation.

It will be seen that the construction of the cutter-shaft and its driving-spindle is practically the same as that of the blank-holding shaft and its driving-spindle, provision being made in each for maintaining an effective frictional engagement between the shaft and the tubular spindle and preventing loose endwise movement of the shaft.

It is necessary under certain conditions to operate the feed-screw 56 by hand, and to this end a hand-wheel 222, Fig. 28, is employed. So far as I am aware it is the usual practice to secure the hand-wheel positively to the feed-screw spindle, so that when the direction of rotation is suddenly changed the inertia of the hand-wheel has to be overcome in the reverse rapid movement of the screw in withdrawing the carriage. The momentum of the wheel when changing to forward feeding movement of the carriage is a cause of sudden shock to the operating parts and is therefore detrimental. To overcome this objection, I provide means for connecting the hand-wheel 222 frictionally with the feed-screw shaft 56, as shown in Fig. 29, the hub of the hand-wheel being provided with a tapered socket 223, which frictionally engages a tapered bushing 224, keyed to the spindle. The hand-wheel is normally loose upon the bushing 224, so that when the operator exerts pressure upon the hand-wheel its hub is firmly engaged with the bushing to effect the manual rotation of the spindle-screw. When the pressure is removed, the hand-wheel is loose and the screw can rotate independently in the hub of the hand-wheel.

I claim—

1. A gear-cutting machine comprising a cutter-carriage, a feed-shaft engaged therewith, driving mechanism including independent driving members and clutch mechanism coöperating alternately therewith, shipping mechanism engaged with a movable part of said clutch mechanism, indexing mechanism, and a rod engaged with said shipping mechanism, with the indexing mechanism, and with the carriage, said rod being composed of sections, one of which has a lost-motion connection with the other and is arranged to set in operation the indexing mechanism, while the other is arranged to actuate the shipping mechanism, the first said rod-section being actuated by the carriage.

2. A gear-cutting machine comprising a cutter-carriage, a feed-shaft engaged therewith, driving mechanism including independent driving members and clutch mechanism coöperating alternately therewith, shipping mechanism engaged with a movable part of said clutch mechanism, a rod composed of sections, one of which is arranged for engagement and operation by the carriage and has a limited endwise movement independently of the other to permit a limited amount of motion of said section and the carriage before the shipping mechanism is operated, and an indexing mechanism controlled by said section, the other section being operated by said beforementioned section and connected to operate the shipping mechanism.

3. A gear-cutting machine comprising a cutter-carriage, a feed-shaft engaged therewith, independent driving members for rotating said feed-shaft, means for engaging the feed-shaft with the driving members alternately, the direction of rotation of the shaft being reversed by each driving member to give the carrriage a slow forward movement and a relatively quick return, a hand-wheel normally loose on the feed-shaft, and conical coöperating surfaces formed on the shaft and hand-wheel respectively, adapted to be brought into frictional engagement by pressure on the hand-wheel and to be disengaged by the momentum of the wheel at the beginning of the rotatory motion of said feed-shaft.

4. A gear-cutting machine comprising a blank-holding shaft, an indexing mechanism adapted to communicate motion to the blank-holding shaft, a cutter-carriage, a feed-shaft engaged therewith, driving mechanism for said shaft including independent driving members and clutch mechanism coöperating alternately therewith, shipping mechanism engaged with a movable part of said clutch mechanism, and a rod composed of two sections joined together by a lost-motion connection permitting one to have a limited endwise motion independently of the other, one said section being arranged to receive direct endwise-acting impulses from the carriage, a trip carried by such rod-section and arranged to set in motion the indexing mechanism, and the other section having connections with the shipping mechanism to actuate the same.

5. A gear-cutting machine comprising a blank-holding shaft, a reciprocating cutter-carriage having a cutter adapted to act on the blank, a feed-shaft engaged with said cutter-carriage, driving mechanism for said feed-shaft including independent driving members and clutch mechanism coöperating alternately therewith, shipping mechanism engaged with a movable part of said clutch mechanism, an indexing mechanism adapted to communicate motion to the blank-holding shaft, and mechanism operated by the carriage in its retractive movement for setting in operation the indexing mechanism and subsequently operating said shipping mechanism to reverse the motion of the feed-shaft, said mechanism consisting of a compound rod formed of two parts and a sleeve attached to one part telescopically surrounding the other part, one part being arranged for engagement by the carriage to engage and move the other part, means carried by said part for tripping and setting in operation the indexing mechanism, and the second part being connected to operate the shipping mechanism.

6. A gear-cutting machine comprising cutting mechanism, a rotary blank-holder, a supporting-bearing therefor, an index-wheel affixed to the blank-holder, a slow-speed rotary driving member meshing with said index-wheel, and automatic means for operating said driving member including a driven gear loosely mounted on the shaft of said member and a clutch positively connected to rotate with and slide axially on said member, and provisions for manually engaging said clutch with said gear and disengaging the same therefrom, whereby the index-wheel may be moved automatically or manually.

7. A gear-cutting machine comprising cutting mechanism, a rotary blank-hólder, a supporting-bearing therefor, an index worm-wheel affixed to the blank-holder, a worm engaged with said index-wheel, a gear-wheel loosely mounted on the shaft of said worm, a clutch member formed on the gear, a complemental clutch member splined on said shaft and movable longitudinally thereon into and out of engagement with the gear clutch member, a spring arranged to move and hold the second clutch member out of contact with the first clutch member, a nut threaded on the worm-shaft and operative to force the clutch members into engagement against the force of said spring, and automatic driving mechanism including gearing meshing with said loose gear.

8. A machine of the character stated, comprising a rotary cutter-holder which includes a shaft and a tubular driving-spindle engaged therewith, said spindle having an external-tapered shoulder, a bearing having an internal-tapered shoulder fitting the tapered shoulder of the spindle, and a nut rotatably mounted on the spindle engaging an abutment thereon and in threaded engagement with the bearing, whereby the tapered shoulder of the spindle may be forced against the tapered portion of the bearing.

9. A machine of the character stated, comprising a rotary cutter-holder which includes a shaft adapted to detachably engage a body to be rotated, said shaft having a tapered external portion, a tubular driving-spindle carrying a driving member and having a tapered internal portion formed to fit the tapered portion of the shaft, a longitudinally-tapered external portion, and a beveled shoulder, means for forcing the tapered portion of the shaft into the tapered portion of the spindle, a bearing having an internal-tapered portion and an internally-beveled shoulder fitting the tapered portion and shoulder respectively of the spindle, means for forcing the tapered portion and shoulder of the spindle against the complemental portions of the bearing, and means for shifting the bearing longitudinally to adjust the cutter.

10. A gear-cutting machine comprising a cutter-carriage having a fixed housing, a bearing movable endwise in said housing, a rotary holder journaled in the bearing, coöperating beveled surfaces on the bearing and holder, means for adjusting the holder endwise in the bearing to take up wear on said beveled surfaces, a cutter secured to said holder, means for adjusting the bearing endwise to adjust the cutter laterally, a sleeve substantially equal in diameter to said holder-adjusting means and keyed to and movable endwise with the holder, and a driving member having a central bore as great in diameter as the external diameter of said holder-adjusting means mounted upon and surrounding said sleeve being connected to slide thereon and rotate therewith.

11. A gear-cutting machine comprising a cutter-carriage formed with a fixed housing having a recess therein, a tubular bearing seated in said recess and having a cylindrical portion provided with an external screw-thread and having an internal-tapered shoulder, a tubular spindle provided with an external-tapered shoulder mounted in said bearings, a nut carried by said spindle and engaged with a threaded extension of the bearing whereby the external-tapered shoulder of the spindle may be brought into contact with the internal-tapered shoulder of the bearing, a cutter-arbor connected with the tubular spindle for rotation thereby, and an adjusting-nut surrounding the cylindrical portion of the bearing and having a screw-thread in engagement with the external screw-thread thereon, said nut being confined in a recess in the housing with its exterior accessible from outside the housing, whereby upon rotation of the nut the bearing, spindle, cutter-arbor and a cutter mounted thereon may be adjusted as a unit.

12. In a gear-cutting machine, a cutter-carriage comprising a housing having a recess and a slot opening into the recess from the exterior of the housing, a bearing located in said recess and movable therein, said bearing having an externally-screw-threaded portion, a nut surrounding said portion in screw-threaded engagement therewith located in said slot and being accessible from the exterior of the housing, whereby the nut may be turned to adjust the bearing, a cutter-holder rotatably contained in the bearing, and a cutting-tool secured to said holder, the holder and tool being arranged to move with the bearing when the latter is adjusted.

In testimony whereof I have affixed my signature in presence of two witnesses.

ERNEST J. FLATHER.

Witnesses:
WILLIAM J. FLATHER,
HERBERT J. ALEXANDER.